United States Patent Office 2,745,847
Patented May 15, 1956

2,745,847

DIEPOXIDES

Benjamin Phillips and Paul S. Starcher, Charleston, W. Va., assignors to Union Carbide and Carbon Corporation, a corporation of New York No Drawing. Application October 8, 1953,
Serial No. 385,026

6 Claims. (Cl. 260—348)

This invention relates to a new class of organic compounds which are useful in plastics and resins industry. More particularly, this invention relates to a new class of diepoxide compounds prepared from the cycloaliphatic esters of polyhydric compounds.

The compounds of this invention may be conveniently represented by the following general formula

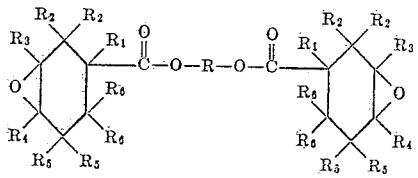

wherein $R_1$, $R_2$, $R_3$, $R_4$, $R_5$ and $R_6$ represent a hydrogen atom or an aliphatic hydrocarbon radical and R represents a divalent organic radical such as, for example, an aliphatic radical and an oxy-alkylene radical.

The compounds of this invention are useful as modifiers for commercially important synthetic condensation resins, and are particularly adapted for use as stabilizers and plasticizers for various synthetic organic resins, and in addition yield permanent, non-migrating compositions which are very valuable in certain commercial applications such as, for example, surface coatings, laminates and plastic molding compositions.

The compounds of this invention are produced by the epoxidation of the olefinic linkages contained in the starting material and may be prepared by either of two oxidation procedures, both of which are satisfactory and provide commercially acceptable yields.

The first oxidation method is called the acetaldehyde monoperacetate method and the reaction whereby the epoxides are formed may be illustrated by the following general equation:

ACETALDEHYDE MONOPERACETATE
METHOD (I)

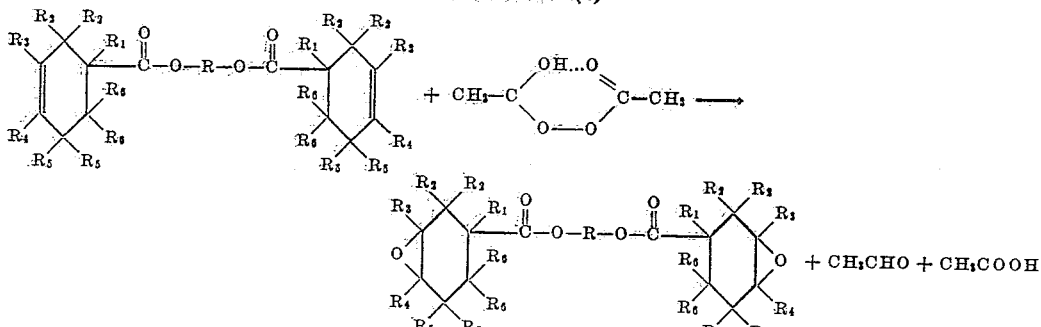

wherein $R_1$, $R_2$, $R_3$, $R_4$, $R_5$ and $R_6$ represent a hydrogen atom or an aliphatic radical and R represents a divalent organic radical.

The second oxidation method is called the peracetic acid method and the reaction whereby the epoxides are formed may be illustrated by the following general equation:

PERACETIC ACID METHOD (II)

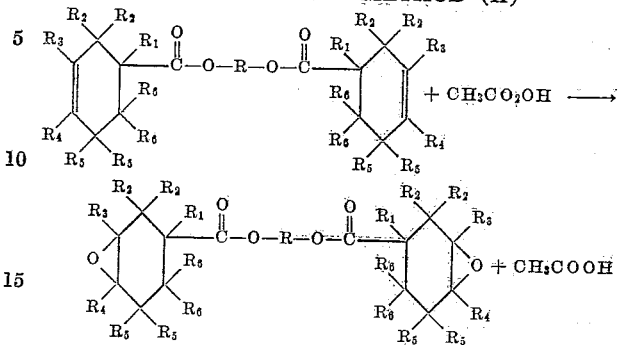

wherein R, $R_1$, $R_2$, $R_3$, $R_4$, $R_5$ and $R_6$ are as above defined.

The use of peracetic acid as the oxidation agent is particularly well suited for the epoxidation reaction since the cyclohexenyl ring is relatively easily converted to the corresponding epoxy form. This particular ability of the peracetic acid and other peracids, in general, to promote clean-cut reactions and provide acceptable yields is not unusual in the art of oxidizing organic compounds for it has long been recognized that the percarboxylic acids occupy somewhat of a unique position in the oxidizing reagent field since they are able to effect several specific types of chemical transformations with acceptable efficiencies, while other powerful oxidizing reagents, such as potassium permanganate are not.

One such type of chemical transformation that the peracids are able to effect is that type of reaction which makes available the compounds of this invention, that is, the oxidation of unsaturated organic compounds to produce the corresponding epoxides.

The unsaturated cycloaliphatic carboxylic acids which are used in the preparation of the starting materials of this invention may be prepared by reacting butadiene or the homologues of butadiene with alpha, beta-unsaturated aliphatic aldehydes, such as, for example, acrolein, methacrolein, crotonaldehyde and the like to yield the corresponding unsaturated cycloaliphatic aldehyde which in turn may be subjected to known oxidation procedures to yield the corresponding unsaturated cycloaliphatic carboxylic acids. Typical unsaturated aldehydes suitable for use in preparing the cycloaliphatic acids are reported in the literature by Sobecki, Ber. 43, 1040 (1910); Diels and Alder, Ann. 460, 106, 121 (1928); Ann. 470, 62–103 (1929) and in their U. S. Patent 1,944,731.

These unsaturated cycloaliphatic carboxylic acids may be readily reacted with aliphatic dihydric compounds to yield the corresponding unsaturated cycloaliphatic diester of the aliphatic dihydric compound.

The following list sets forth series of dihydric alcohols which are suitable for use in preparing the compounds of this invention:

PARAFFIN GLYCOLS (A) 1,2-glycols:
Ethylene glycol
Propane-1,2-diol
(B) 1,3-glycols:
Propane-1,3-diol
Pentane-2,4-diol
2,2-dimethyltrimethylene glycol
2-ethylhexanediol-1,3
(C) 1,4-glycols:
Butane-1,4-diol
2-methylpentane-2,5-diol
3-methylpentane-2,5-diol
Hexane-1,4-diol
Hexane-2,5-diol
2,5-dimethylhexane-2,5-diol
(D) 1,5-glycols:
Pentane-1,5-diol
Hexane-1,5-diol
2-methoxymethyl-2,4-dimethyl pentane-1,5-diol
2-ethoxymethyl-2,4-dimethyl-pentane-1,5-diol
(E) Misc. glycols:
Octadecane-1,12-diol

UNSATURATED GLYCOLS (A) Olefinic glycols:
1-butene-3,4-diol
2-butene-1,4-diol
(B) Diolefinic glycols:
1,5-hexadiene-3,4-diol
2,6-octadiene-4,5-diol
(C) Acetylenic glycols:
2-butyne-1,4-diol
3-hexyne-2,5-diol
2,5-dimethyl-3-hexyne-2,5-diol

GLYCOL DERIVATIVES (A) Polyethylene glycols:
Diethylene glycol
Triethylene glycol
Dipropylene glycol As may be readily understood, the products of this invention are particularly attractive in view of the fact that they are potentially low cost chemicals since butadiene, homologs of butadiene and the alpha, beta-unsaturated aldehydes are economical starting materials and the steps required to produce the epoxides are conducted with high efficiencies.

The following examples will serve to illustrate the practice of the invention:

EXAMPLE I

*Preparation of diethylene glycol bis-(3,4-epoxycyclohexanecarboxylate*

Two hundred and fifty grams of diethylene glycol bis-(3-cyclohexenecarboxylate) were heated in a flask with agitation to 40° C. Then 833 grams of 21.3 per cent solution of peracetic acid in acetone (177 grams, 2.33 mols, of peracetic acid) were added dropwise over a period of two hours. The reaction solution was maintained at 40° C. by cooling with a cold water bath. After addition was complete, the reaction conditions were maintained for an additional four hours, whereupon an analysis indicated that all of the peracetic acid had been consumed.

After being stored at 11° C. for sixteen hours, the reaction solution was mixed with 2200 grams of ethyl-benzene and the resulting solution distilled under reduced pressure at a maximum temperature of 50° C. After the low-boiling material had been stripped off, there were obtained 278 grams of residue product which analyzed 89.5 per cent as diethylene glycol bis-(3,4-epoxycyclohexanecarboxylate) by determination for epoxide groups, 3.8 per cent as unreacted diethylene glycol bis-(3-cyclohexenecarboxylate) by determination of double bonds, and 0.38 per cent acidic impurities calculated as acetic acid. The yield of the diepoxide product was 89.5 per cent of theory.

EXAMPLE II

*Preparation of 2-ethyl-1,3-hexanediol bis(3,4-epoxycyclohexanecarboxylate)*

To one hundred and fifty-seven grams of 2-ethyl-1,3-hexanediol bis(3-cyclohexenecarboxylate) (0.434 mol) there were added dropwise, over a period of one and one-half hours, three hundred and thirty-eight grams of a 24.5 per cent solution of peracetic acid in acetone (83 grams, 1.095 mols of peracetic acid). The reaction solution was stirred and kept at 22–25° C. by immersing the reaction flask in a cool water bath. After the addition was complete, the reaction conditions were maintained the same for four and one-half hours longer and then the solution was stored at —11° C. for sixteen hours. Analysis at the end of this time indicated 94 per cent of the theoretical amount of peracetic acid had been consumed.

The reaction solution was then added dropwise to a still kettle containing 500 grams of ethyl benzene refluxing at 55° C. at 35 mm. of Hg pressure and during addition, acetic acid, peracetic acid, acetone, and ethyl benzene were distilled off at the top of the kettle. After addition was complete, all low-boiling constituents were stripped off up to a temperature of 90° C. at 3 mm. of Hg pressure. There was obtained, as residue product, 166 grams of a hazy viscous liquid which analyzed 86.8 per cent as 2-ethyl-1,3-hexanediol bis-(3,4-epoxycyclohexanecarboxylate) by analysis for epoxide groups and 10.2 per cent as unreacted 2-ethyl-1,3-hexanediol-bis-(3-cyclohexenecarboxylate) by analysis for double bonds. The yield of the diepoxide product was 84.3 per cent of theory.

EXAMPLE III

*Preparation of diethylene glycol bis-(6-methyl-3,4-epoxycyclohexanecarboxylate)*

Two hundred and ninety-seven grams of diethylene glycol bis-(6-methyl-3-cyclohexenecarboxylate) were added dropwise, over a two hour period, with stirring at a temperature of 25–30° C., to 670 grams of a 21.2 per cent solution of peracetic acid in acetone (161 grams, 2.122 mols of peracetic acid). The reaction solution was maintained at the above-mentioned temperature by immersing the flask in a water bath and after addition was complete, the reaction conditions were maintained for an additional four hours whereupon the solution was stored for sixteen hours at —11° C.

The reaction solution was then fed dropwise into a still kettle containing 1000 grams of ethyl benzene refluxing at 45° C. at 35 mm. of Hg pressure and acetone, acetic acid, peracetic acid, and ethyl benzene were distilled off. After addition was complete, the product was stripped of low-boiling constituents up to a kettle temperature of 90° C. at 2 mm. of Hg pressure. There was obtained as residue product, 330 grams of amber-colored viscous liquid which analyzed 86.4 per cent purity as diethylene glycol bis-(6-methyl-3,4-epoxycyclohexanecarboxylate) by analysis for epoxide groups and 13.0 per cent as unreacted diethylene glycol bis-(6-methyl-3-cyclohexenecarboxylate) by analysis for double bonds. The yield was 87.8 per cent of theory.

EXAMPLE IV

*Preparation of 3-methyl-1,5-pentanediol bis-(3,4-epoxycyclohexanecarboxylate)*

Six hundred sixty-three grams of a 24.0 per cent solution of peracetic acid in acetone (159 grams, 2.097 mols, of peracetic acid) were fed dropwise over a period of two hours ten minutes to 220 grams (0.839 mol) of 3-methyl-1,5-pentanediol bis - (3-cyclohexenecarboxylate)

stirring at 20–50° C. After addition was complete, the solution was allowed to react under the same conditions for two and one-half hours longer, at which time analysis indicated that all of the peracetic acid had been consumed.

The reaction solution was stored at −11° C. for sixteen hours and then was fed dropwise into a still kettle containing 1000 grams of ethyl benzene refluxing at 45° C. at 35 mm. of Hg pressure. During the addition, acetone, acetic acid, peracetic acid, and ethyl benzene were distilled off at the top of the kettle. The product was stripped of low-boiling constituents to a kettle temperature of 90° C. at 2 mm. of Hg pressure and there were obtained 314 grams of light yellow viscous liquid residue product which analyzed 96.3 per cent as pure 3-methyl-1,5-pentanediol bis-(3,4-epoxycyclohexanecarboxylate) by epoxide analysis, and 7.65 per cent unreacted 3-methyl-1,5-pentanediol bis-(3-cyclohexenecarboxylate) by analysis for double bonds. The yield was 88.3 per cent of theory.

EXAMPLE V

Preparation of 2-methoxymethyl-2,4-dimethyl-1,5-pentanediol bis-(3,4-epoxycyclohexanecarboxylate)

Seven hundred forty-five grams of a 21.0 per cent solution of peracetic acid in acetone (156 grams, 2.019 mols of peracetic acid) were fed dropwise over a period of three hours fifteen minutes to 264 grams (0.673 mol) of 2-methoxy-methyl-2,4-dimethyl-1,5-pentanediol bis-(3-cyclohexanecarboxylate) stirring at 40–50° C. After addition was complete, the reaction was allowed to proceed under the same conditions for three more hours and then stored for sixteen hours at −11° C.

The reaction solution was then fed dropwise into a still kettle containing 1800 grams of ethyl benzene refluxing at 45° C. at 35 mm. of Hg pressure. During the addition, acetone, acetic acid, peracetic acid and ethyl benzene were distilled off at the top of the kettle. The product was stripped of low-boiling constituents to a kettle temperature of 85° C. at 3 mm. of Hg pressure. There were obtained 274 grams of residue which was 72.5 per cent 2-methoxymethyl-2,4-dimethyl-1,5-pentanediol bis-(3,4-epoxycyclohexanecarboxylate) by epoxide analysis and 6.0 per cent unreacted 2-methoxy-2,4-dimethyl-1,5-pentanediol bis-(3-cyclohexenecarboxylate) by analysis for double bonds. The yield was 69.6 per cent of theory.

EXAMPLE VI

Preparation of triethylene glycol bis-(3,4-epoxycyclohexanecarboxylate)

Nine hundred fifty-five grams of a 21.0 per cent solution of peracetic acid in acetone (200 grams, 2.64 mols, of peracetic acid) were fed dropwise over a period of three hours fifteen minutes to 322 grams (0.88 mol) of triethylene glycol bis-(3-cyclohexenecarboxylate) with stirring. The reaction was very exothermic and the temperature of the reaction solution was maintained at 40–50° C. by immersing the flask in a cold water bath. After addition was complete, the reaction conditions were maintained for an additional two and one-half hours, at which time, analysis indicated that all of the peracetic acid had been consumed.

The reaction solution was stored for sixteen hours at −11° C. and then added dropwise to a still kettle containing 2500 grams of ethyl benzene refluxing at 40 mm. of Hg pressure. Acetone, acetic acid, peracetic acid and ethyl benzene were distilled off at the top of the kettle during the addition and the kettle residue was finally stripped of low-boiling constituents up to 70° C. at 3 mm. of Hg pressure. There were obtained 355 grams of viscous liquid analyzing 79.6 per cent as triethylene glycol bis-(3,4-epoxycyclohexanecarboxylate) by epoxide group analysis and 8.1 per cent unreacted triethylene glycol bis-(3-cyclohexenecarboxylate) by analysis for double bonds. The yield of diepoxide was 80.8 per cent of theory.

EXAMPLE VII

Preparation of 1,5-pentanediol bis-(3,4-epoxycyclohexanecarboxylate)

Nine hundred forty-five grams of a 21.0 per cent solution of peracetic acid in acetone (198 grams, 2.61 mols, of peracetic acid) were fed dropwise over a period of two hours ten minutes to 278 grams (0.87 mol) of 1,5-pentanediol bis-(3-cyclohexenecarboxylate) with stirring at 40–50° C. The reaction conditions were maintained for an additional two hours and forty-five minutes after addition was complete and then the solution was stored for sixteen hours at −11° C.

The reaction solution was added dropwise to a still kettle containing 2500 grams of ethyl benzene refluxing at 40 mm. of Hg pressure and acetone, peracetic acid, acetic acid, and ethyl benzene were distilled off at the top of the kettle. After addition was complete, all low-boiling constituents were stripped off up to a kettle temperature of 70° C. at 3 mm. of Hg pressure. There were obtained 311 grams of residue product which analyzed 84.3 per cent 1,5-pentanediol bis-(3,4-epoxycyclohexanecarboxylate) by analysis for epoxide groups and 6.94 per cent unreacted 1,5-pentanediol bis-(3-cyclohexenecarboxylate) by analysis for double bonds. The yield was 84.6 per cent of theory.

EXAMPLE VIII

Preparation of ethylene glycol bis-(3,4-epoxycyclohexanecarboxylate)

Sixteen hundred eighty grams of a 24.9 per cent solution of peracetic acid in acetone (418 grams, 5.5 mols, of peracetic acid) were fed dropwise over a period of four hours to 613 grams (2.2 mols) of ethylene glycol bis-(3-cyclohexenecarboxylate) with stirring at 35–40° C. On completion of the addition, the reaction was allowed to proceed under the same conditions for an additional four hours and then the reaction solution was stored for sixteen hours at −11° C. At this time analysis showed that 98.8 per cent of the peracetic acid had been consumed.

The reaction solution was dissolved in 1600 grams of ethyl benzene and then distilled to remove all low-boiling constituents up to a kettle temperature of 70° C. and 2 mm. of Hg pressure. There were obtained 614 grams of residue product which analyzed 83.8 per cent as ethylene glycol bis-(3,4-epoxycyclohexanecarboxylate) by analysis for epoxide groups, 5.0 per cent unreacted ethylene glycol bis-(3-cyclohexenecarboxylate) by analysis for double bonds, and 0.5 per cent acidic impurities calculated as acetic acid. The yield was 75.4 per cent of theory.

EXAMPLE IX

Preparation of 1,6-hexanediol bis-(3,4-epoxycyclohexanecarboxylate)

Five hundred and eighty-four grams of 1,6-hexanediol bis-(3-cyclohexenecarboxylate) (1.75 mols) were placed in a flask and 1560 grams of a 25.5 per cent solution of peracetic acid in acetone was added over a four hour period. The reaction was exothermic and the solution was maintained at 35–40° C. by cooling with an ice water bath as required. After the addition was complete, the reaction conditions were maintained for an additional one hour.

The reaction solution was fed dropwise into a still kettle containing 1750 grams of ethyl benzene refluxing at 25 mm. of Hg pressure. Acetone, acetic acid, peracetic acid, and ethyl benzene were distilled off at the head during the addition period. After all of the reaction solution had been added, the residue product was stripped of ethyl benzene and there were obtained 665 grams of product analyzing 88.6 per cent as 1,6-hexanediol bis-(3,4-epoxycyclohexanecarboxylate) by analysis for epoxide groups and 3.5 per cent as unreacted diene by analysis for double bonds. The yield of diepoxide corresponded to 92 per cent of theory.

What is claimed is:

1. The dihydric alcohol diesters of acids selected from the group consisting of 3,4-epoxycyclohexanecarboxylic acid and lower alkyl substituted 3,4-epoxycyclohexanecarboxylic acids in which the hydroxyl groups of said dihydric alcohols are esterified by said acids and wherein said dihydric alcohol represents members selected from the group consisting of lower aliphatic hydrocarbon glycols and polyalkylene glycols corresponding to the general formula:

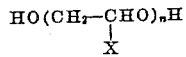

wherein X represents members selected from the group consisting of hydrogen and methyl groups and $n$ represents a positive integer in the range of from 2 through 3.

2. Ethylene glycol bis-(3,4-epoxycyclohexanecarboxylate).

3. 2-ethyl-1,3-hexanediol bis-(3,4-epoxycyclohexanecarboxylate).

4. 3-methyl-1,5-pentanediol bis-(3,4-epoxycyclohexanecarboxylate).

5. 1,5-pentanediol bis-(3,4-epoxycyclohexanecarboxylate).

6. 1,6-hexanediol bis-(3,4-epoxycyclohexanecarboxylate).

No references cited.